UNITED STATES PATENT OFFICE.

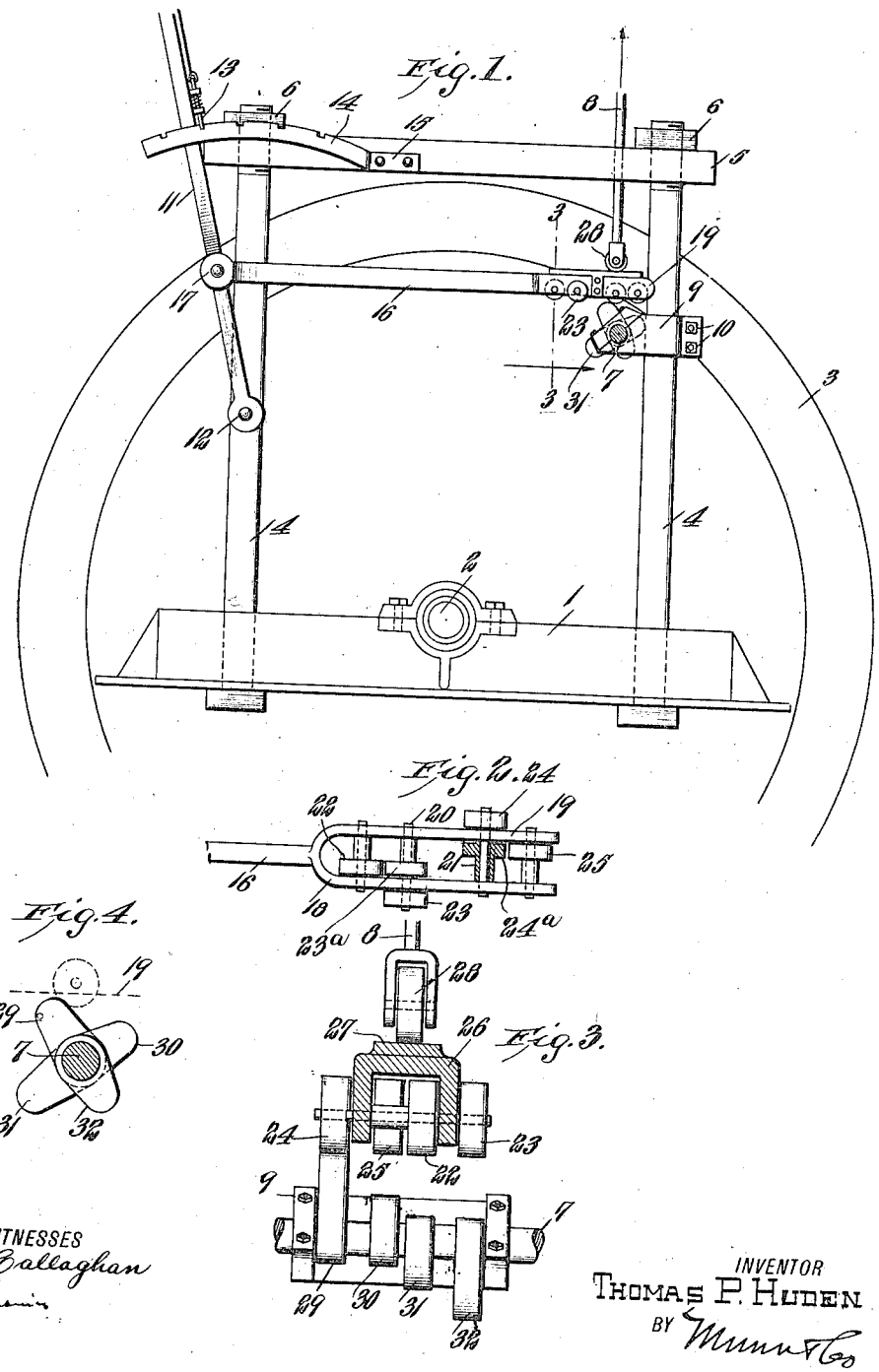

THOMAS P. HUDEN, OF NORTH BEND, OREGON.

GAS-ENGINE-VALVE TIMER.

959,345.

Specification of Letters Patent. Patented May 24, 1910.

Application filed June 29, 1909. Serial No. 504,980.

*To all whom it may concern:*

Be it known that I, THOMAS P. HUDEN, a citizen of the United States, and a resident of North Bend, in the county of Coos and State of Oregon, have invented certain new and useful Improvements in Gas-Engine-Valve Timers, of which the following is a specification.

My invention is an improvement in gas engine valve timers and consists in certain novel constructions and combinations of parts hereinafter described and claimed.

Referring to the drawings forming a part hereof, Figure 1 is a side view of a portion of an engine provided with the improvement. Fig. 2 is a plan view of one end of the lever. Fig. 3 is a section on the line 3—3 of Fig. 1 looking in the direction of the arrow and Fig. 4 is an end view of the cam shaft.

In the embodiment of the invention shown in the drawings the bearing 1 which supports one end of the engine shaft 2 carrying the fly wheel 3, is provided near each end with an upright rod or bolt 4, which passes through the bearing, and a cross plate 5 connects the rods at their upper ends, the plate being secured in place by the nuts 6. The cam shaft 7 for operating the push rod 8 of the valve stem, is journaled in a bearing 9 on one of the rods 4, the bearing being split and secured on the post by bolts 10. A lever 11 is pivoted to the other rod as at 12, and upon the said lever is movable a spring tooth 13, which is adapted to engage a toothed quadrant 14 secured to the cross plate 5 as at 15. A link 16 is pivoted by one end as at 17 to the lever 11, and at its other end the link is provided with a fork 18, in whose arms 19 are journaled a plurality of shafts 20, and a sleeve or arbor 21 encircles each shaft between the arms. Rollers 22, 23, 24 and 25 are arranged on the shafts in offset or staggered relation with respect to each other, the first roller 22 being between the arms and adjacent to one, the last roller 25 being between the arms and adjacent to the other while the rollers 23 and 24 are outside of the arms, one being outside of the arm adjacent to the roller 22 and the other outside of the arm adjacent to the roller 25. A covering plate 26 connects the arms at the upper sides thereof, and extends across the space therebetween the said covering plate being integral with the arms or secured thereto in any suitable manner, and the upper surface thereof is flattened as at 27 to form a run way for the roller 28 on the lower end of the push rod 8. The cam shaft 7 before mentioned, is provided with four cams 29, 30, 31, and 32, which are adapted to contact with the respective rollers 24, 25, 22 and 23, when the lever 16 is moved to bring a roller over its corresponding cam. The cam 29 is for the ahead motion with full compression, the cam 30 is for the ahead motion with partial compression, the cam 31 is for the reverse with full compression and the cam 32 is for the reverse with partial compression.

In operation, the engine which is preferably provided with a compressed air starting device, and with the usual sparking device, is started by the said compressed air device. The lever 11 is arranged in the vertical position, with the tooth 13 in engagement with the central notch of the quadrant, the said quadrant being provided with five notches. When in this position, the lever 16 is in the neutral position, and the cams will be entirely out of engagement with the rollers. If it is desired to start in the forward direction, the lever is moved to the right of Fig. 1, one notch, which will bring the roller 24 above the cam 29, and in position for engagement thereby when the cam shaft is rotated. As the shaft is rotated the cam 29 will engage the roller 24 and raise the link 16, thus moving the push rod upward to operate the valves. As the engine picks up speed, the lever is moved into the last notch to the right, which cuts off the relief and operates the engine under full compression. To reverse the lever is moved in the opposite direction.

It will be evident from the description that to reverse the engine it is necessary to move the lever to the neutral position, before it can be reversed.

It will be observed from an inspection of Fig. 2, that the shafts 20 which carry the rollers 23 and 24 are also provided between the arms with rollers 23ᵃ and 24ᵃ, which are for the purpose of operating the valve to open the exhaust at every revolution of the crank, this being necessary for the proper working of the engine when starting.

I claim:—

1. A device of the class described comprising in combination with the valve operating rod of the engine, of a cam shaft with a plurality of cams, a lever pivoted adjacent to the engine, means for securing the lever in adjusted position, a link pivoted by one end to the lever and provided at the other with a fork, shafts journaled in the arms of the fork and corresponding in number to the number of the cams on the cam shaft, a roller on each shaft, said rollers being arranged in staggered relation with respect to each other, and corresponding in position to the position of the cams, said link having a surface above the rollers, the push rod having a roller moving on said surface, said rollers being arranged in pairs, the pairs being spaced apart from each other for the purpose set forth.

2. A device of the class described, comprising in combination with the valve operating rod of the engine, a link having a plane surface upon which the rod rests, a cam shaft, a plurality of cams thereon arranged in spaced relation, a roller for engagement by each cam on the link, and arranged longitudinally thereof and in spaced relation, means for moving the link whereby to engage the rollers with the respective cam, and means for retaining the link in adjusted position.

3. A device of the class described, comprising in combination with the valve operating rod of the engine, a link having a plane surface upon which the rod rests, a cam shaft, a plurality of cams thereon arranged in spaced relation, a roller for engagement by each cam on the link, and arranged longitudinally thereof and in spaced relation and means for moving the link whereby to engage the rollers with the respective cam.

4. A device of the class described comprising in combination with the valve operating rod of the engine, of a link having a plane surface upon which the rod rests, a cam shaft, a plurality of cams thereon, rollers on the link corresponding in number and position to the number and position of the cams, and means for moving the links whereby to engage the rollers with the respective cams.

THOMAS P. HUDEN.

Witnesses:
   G. J. LEMENSKI,
   JOHN H. GREVES.